United States Patent
Drew

(10) Patent No.: US 6,955,143 B2
(45) Date of Patent: Oct. 18, 2005

(54) INTERNAL COMBUSTION ENGINE

(76) Inventor: Julius Drew, 3310 Cotton Mill Dr., Apt. 301., Raleigh, NC (US) 27612

( * ) Notice: Subject to any disclaimer, the term of this patent is extended or adjusted under 35 U.S.C. 154(b) by 6 days.

(21) Appl. No.: 10/682,099

(22) Filed: Oct. 10, 2003

(65) Prior Publication Data

US 2005/0076880 A1 Apr. 14, 2005

(51) Int. Cl.[7] .............................................. F02B 75/18
(52) U.S. Cl. .................................................... 123/56.1
(58) Field of Search ........................... 123/65 VB, 58.5, 123/58.6, 56.1, 57.1, 45 A, 45 R

(56) References Cited

U.S. PATENT DOCUMENTS 2,224,229 A * 12/1940 Miller ........................ 123/65 S
6,481,393 B1 * 11/2002 Drew .......................... 123/56.1

* cited by examiner

Primary Examiner—Henry C. Yuen
Assistant Examiner—Hyder Ali
(74) Attorney, Agent, or Firm—Jack Schuman

(57) ABSTRACT

Fuel/air mixture is introduced transversely through cylinder into combustion chamber where it is ignited by spark plug to drive compound piston assembly to bottom of its stroke to rotate drive shaft. In another embodiment, air is introduced transversely through cylinder into combustion chamber, and diesel fuel is injected into combustion chamber and ignited when compound piston assembly reaches the top of its stroke to drive down compound piston assembly and rotate drive shaft.

2 Claims, 3 Drawing Sheets

INTERNAL COMBUSTION ENGINE

BACKGROUND OF THE INVENTION

1. Field of the Invention

This invention relates, broadly speaking, to a novel internal combustion engine.

2. Description of the Prior Art

No prior art showing internal combustion engines directly related to the present invention is known to the inventor.

However, internal combustion engines bearing only a superficial resemblance to the structure of the present invention are known. For example, see U.S. Pat. No. 6,481,393 issued Nov. 19, 2002.

SUMMARY OF THE PRESENT INVENTION

One of the objects of the present invention is to provide a novel internal combustion engine.

Still other and further objects of the present invention will become apparent by reference to the accompanying specification and drawings, and to the appended claims.

Briefly, the foregoing objects are attained by providing an internal combustion engine having a unique structure in which fuel is injected transversely of the engine into the cylinder, is ignited in one case by a spark plug and, in another case, by compression of a diesel fuel/air mixture to the point of ignition, to drive the piston and rotate the drive shaft, and exhaust is discharged longitudinally of the engine.

DESCRIPTION OF THE DRAWINGS

Referring now to the drawings, in which like numerals represent like parts in the several views.

DESCRIPTION OF THE PREFERRED EMBODIMENTS

Figure 1:
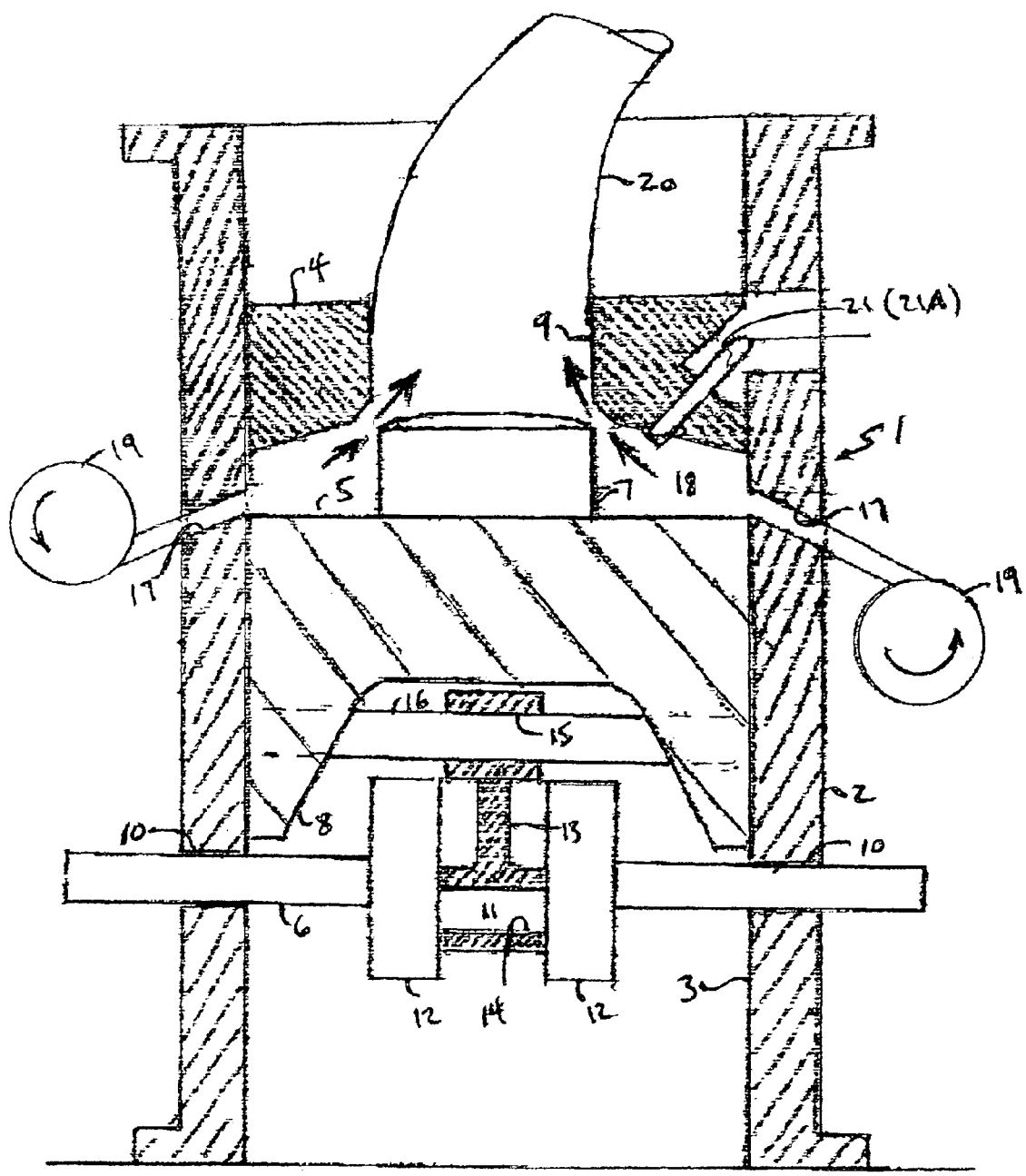
FIG. 1 represents, diagrammatically and not to scale, a longitudinal medial view, partially in section, of the internal combustion engine, showing the compound piston assembly at the bottom of its stroke.
Figure 2:
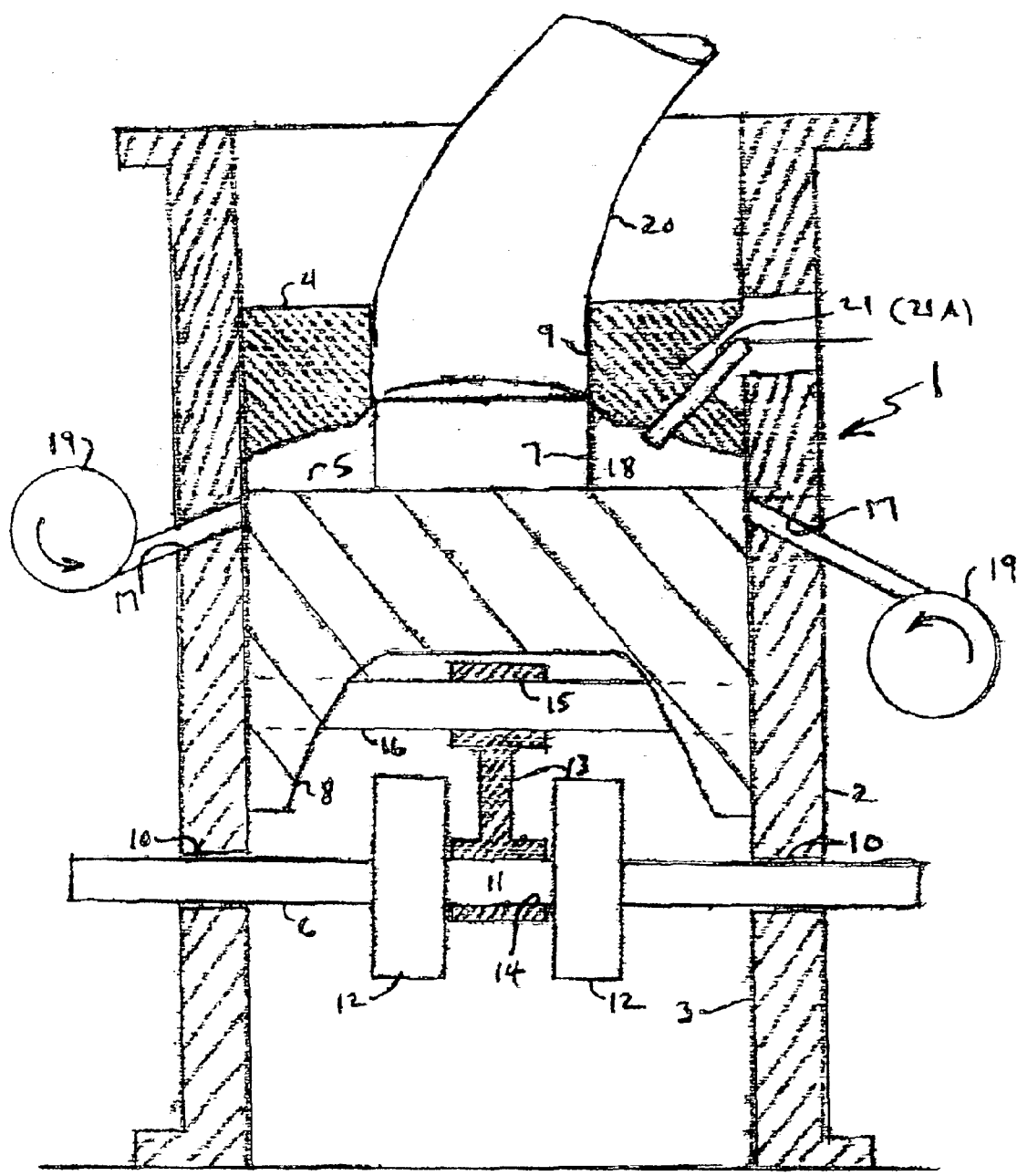
FIG. 2 represents, diagrammatically and not to scale, a longitudinal medial view similar to FIG. 1 showing the compound piston assembly at an intermediate position.
Figure 3:
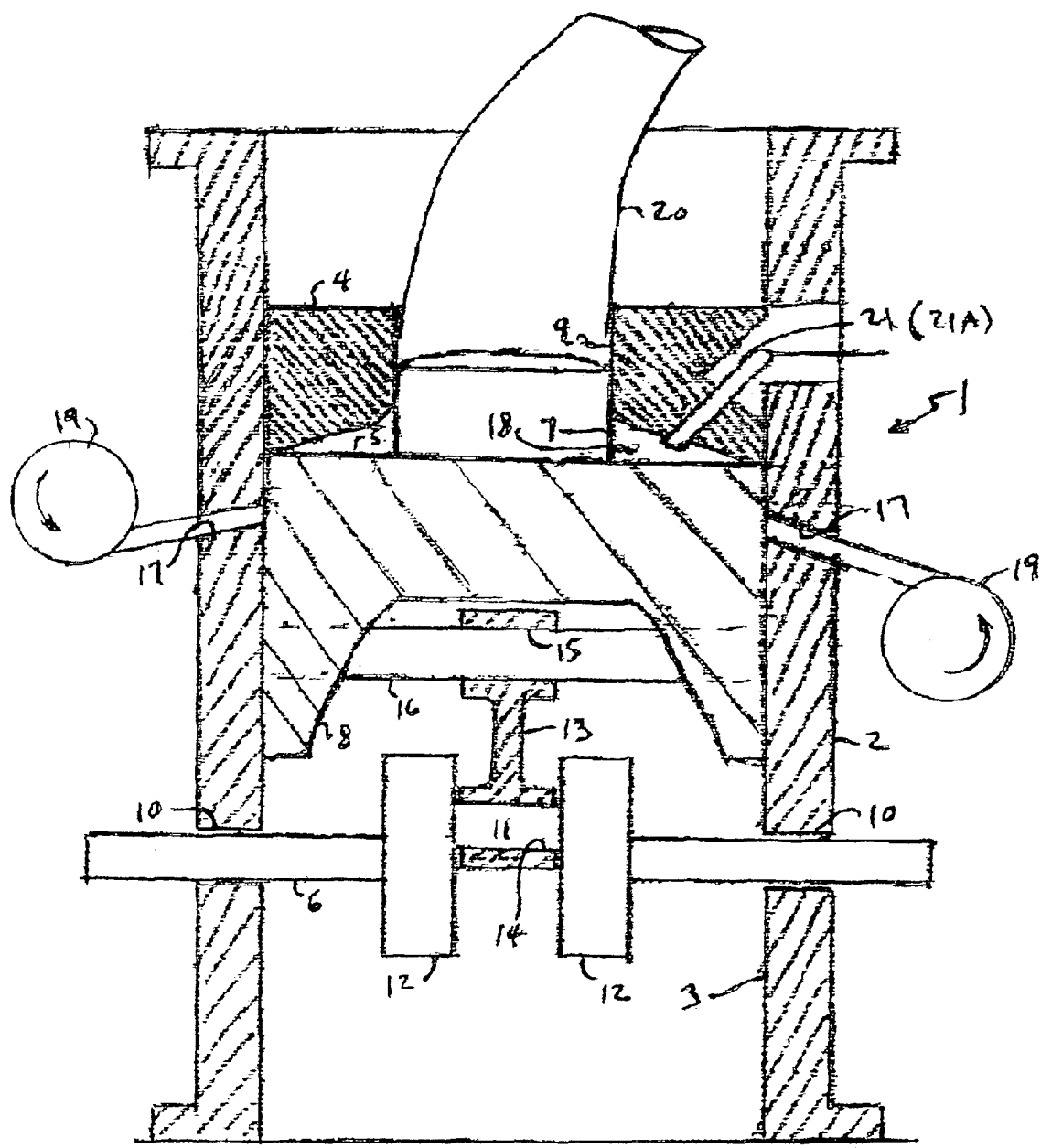
FIG. 3 represents, diagrammatically and not to scale, a longitudinal medial view similar to FIG. 1, showing the compound piston assembly at the top of its stroke.

The structure common to both embodiments herein is described as follows:

Internal combustion engine 1 comprises hollow cylinder 2 having a central bore 3 therein, a circular cylinder head 4 fixedly mounted within cylinder 2, a circular compound piston assembly 5 longitudinally movable within cylinder 2, and rotatable drive shaft 6.

Compound piston assembly 5 comprises a small diameter piston 7 and a hollow large diameter main piston 8, said pistons 7 and 8 being secured to each other.

Small diameter piston 7 slidably engages central bore 9 in cylinder head 4.

Large diameter main piston 8 slidably engages central bore 3 in cylinder 2.

Rotatable drive shaft 6 extends through apertures 10 in opposite sides of cylinder 2, and is provided with cam 11 bounded by side members 12. Crank 13 is provided at one end with aperture 14 receiving cam 11. The other end of crank 13 extends into the hollow of main piston 8 and is provided with aperture 15. Rod 16, mounted to and within The hollow of main piston 8, extends through aperture 15. Rotatable drive shaft 6 is provided with a fly wheel (not shown).

Inlets 17 extends through the sides of cylinder 2 into the combustion chamber 18, between cylinder head 4 and main piston 8.

Blowers 19 are connected to discharge into inlets 17.

Exhaust conduit 20 communicates with central bore 9 of cylinder head 4.

The defining structure and operation for that embodiment of the invention using spark ignition will now be described.

As shown in FIG. 1, with compound piston assembly 5 at the bottom of its stroke, inlets 17 are open to the combustion chamber 18, and small diameter piston 7 has exited central bore 9 of cylinder head 4, the said bore 9 thus being open. Spark plug 21, mounted in cylinder head 4, extends into combustion chamber 18. Blowers 19 discharge a fuel/air mixture into combustion chamber 18, driving out of engine 1 through exhaust conduit 20 the products of combustion of the previous cycle of operation, as indicated by the arrows. The momentum of the fly wheel continues the rotation of drive shaft 6 and of cam 11 thereon, forcing up crank 13, rod 16 and compound piston assembly 5. As compound piston assembly 5 ascends, inlets 17 are closed, and small piston 7 enters and closes central bore 9 of cylinder head 4. Adjacent the top of the stroke of compound piston assembly 5, spark plug 21 is fired, igniting the fuel/air mixture in the combustion chamber 18, driving compound piston assembly 5 to the bottom of its stroke, thus continuing the rotation of drive shaft 6.

The defining structure and operation of that embodiment of the invention employing the diesel principle will now be described.

Instead of spark plug 21 used in the previously described embodiment, this embodiment employs a diesel fuel injector 21A mounted in the cylinder head 4. Blowers 19 introduce air into combustion chamber 18, as shown in FIG. 1. Diesel fuel is injected into the combustion chamber 18 by means of diesel fuel injector 21A.

The momentum of the fly wheel continues the rotation of drive shaft 6 and, through cam 11, crank 13 and rod 16, compound piston assembly 5 is forced upwardly to the top of its stroke, thus compressing the mixture of air and diesel fuel in the combustion chamber 18.

The dimensions of combustion chamber 18 relative to the volume of the mixture of diesel fuel and air therein are chosen so that the compression of the mixture of air and diesel fuel in the combustion chamber 18 at the top of the stroke of compound piston assembly 5 raises to the ignition point the temperature of the said mixture of air and diesel fuel. The exhaust gases so produced will generate pressure sufficient to bear against the upper surface of main piston 8 and thereby force compound piston assembly 5 downwardly to the bottom of its stroke, thus continuing the rotation of drive shaft 6. As before, small piston 7 has exited central bore 9 of cylinder head 4, and the exhaust gases are forced out of engine 1 through exhaust conduit 20 by the introduction of the next charge of air.

Since modifications and changes which do not depart from the spirit of the invention as disclosed herein may readily occur to those skilled in the art to which this invention pertains, the appended claims should be construed as covering all suitable modifications and equivalents.

I claim:

1. Internal combustion engine comprising:
   (a) a cylinder,
   (b) a first central bore in said cylinder,
   (c) a cylinder head secured to said cylinder adjacent one end thereof,
   (d) a second central bore extending through said cylinder head,
   (e) a compound piston assembly positioned in said cylinder and movable between the bottom of its stroke and the top of its stroke, said compound piston assembly comprising:
      (i) a first piston slidably extendable into said second bore and movable between a first position in said second bore to close said second bore and a second position outside said second bore to open said second bore,
      (ii) a main piston larger in diameter than and secured to said first piston and slidably engaging said first bore,
   (f) a combustion chamber within said cylinder and defined by said first central bore, the upper face of said main piston and the lower surface of said cylinder head,
   (g) a diesel fuel injector extending into said combustion chamber,
   (h) means to introduce air transversely into said combustion chamber,
   (i) exhaust conduit means communicating with said second bore,
   (j) a rotatable drive shaft extending transversely through said cylinder,
   (k) shaft rotating means operatively interposed between said compound piston assembly and said drive shaft to rotate said drive shaft upon longitudinal movement of said compound piston assembly in said cylinder,
   (l) the dimensions of said combustion chamber being selected so that when said compound piston assembly reaches the top of its stroke within said cylinder, the temperature of the air and diesel fuel within said combustion chamber reaches the ignition point,
   (m) whereby, upon ignition of said air and diesel fuel within said combustion chamber, said compound piston assembly is forced longitudinally in said cylinder toward the bottom of its stroke thereby to rotate said drive shaft.

2. Internal combustion engine as in claim 1, said shaft rotating means comprising:
   (n) a cam on said drive shaft,
   (o) a crank having a first aperture through one end thereof and a second aperture through the opposite end thereof,
   (p) a rod extending transversely through said cylinder and secured to said compound piston assembly,
   (q) said first aperture in said crank rotatably receiving said rod,
   (r) said second aperture in said crank rotatably receiving said cam.

* * * * *